United States Patent
Luo et al.

(10) Patent No.: US 12,179,947 B2
(45) Date of Patent: Dec. 31, 2024

(54) REBAR BUNDLING MACHINE, REPLACEABLE GUN HEAD AND WORKING METHOD THEREOF

(71) Applicant: Guangdong Shunde Huayan Electronic Technology Co., Ltd., Foshan (CN)

(72) Inventors: Yongyang Luo, Foshan (CN); Yiqing Li, Foshan (CN); Yingguo Yi, Foshan (CN); Xiunan Xiao, Foshan (CN); Jiayuan Wu, Foshan (CN); Changyong Xu, Foshan (CN); Chao Li, Foshan (CN)

(73) Assignee: Guangdong Shunde Huayan Electronic Technology Co., Ltd., Foshan (CN)

( * ) Notice: Subject to any disclaimer, the term of this patent is extended or adjusted under 35 U.S.C. 154(b) by 1076 days.

(21) Appl. No.: 17/047,459

(22) PCT Filed: May 29, 2018

(86) PCT No.: PCT/CN2018/088828
§ 371 (c)(1),
(2) Date: Oct. 14, 2020

(87) PCT Pub. No.: WO2019/210548
PCT Pub. Date: Nov. 7, 2019

(65) Prior Publication Data
US 2021/0155357 A1    May 27, 2021

(30) Foreign Application Priority Data
May 3, 2018    (CN) .......................... 201810412848.3

(51) Int. Cl.
*B65B 13/02*    (2006.01)
*B23Q 3/155*    (2006.01)

(52) U.S. Cl.
CPC ........ *B65B 13/025* (2013.01); *B23Q 3/15546* (2013.01)

(58) Field of Classification Search
CPC ..... B65B 13/025; B65B 13/18; B65B 13/185; E04G 21/122; E04G 21/123; B23Q 3/15546
See application file for complete search history.

(56) References Cited

U.S. PATENT DOCUMENTS

| | | | |
|---|---|---|---|
| 9,856,041 B2 | 1/2018 | Itagaki | |
| 2015/0127137 A1* | 5/2015 | Brandt | B23K 10/02 700/166 |
| 2016/0201342 A1* | 7/2016 | Sivadjian | E04G 21/122 140/93 A |

FOREIGN PATENT DOCUMENTS

| | | |
|---|---|---|
| CN | 204383801 U | 6/2015 |
| CN | 104943896 A | 9/2015 |

(Continued)

*Primary Examiner* — Debra M Sullivan
(74) *Attorney, Agent, or Firm* — The Dobrusin Law Firm, PC

(57) ABSTRACT

The invention discloses a rebar bundling machine, a replaceable gun head and a working method thereof. The replaceable gun head according to the present invention comprises a gun head information identification component provided on the gun head, wherein after mounting the gun head on the rebar bundling machine, the gun head information identification component is connected to a main control unit of the rebar bundling machine, and the main control unit obtains information of the gun head through the gun head information identification component. The rebar bundling machine of the present invention comprises a gun shell, a main control unit provided in the gun shell, and the replaceable gun head mounted on the front end of the gun shell; in the present invention, the number of rotations for the wire feeding motor and the torque threshold for the wire twisting (Continued)

motor are set for different muzzle information, so as to control the length and torque of the wire output from the rebar bundling machine with different gun heads; the invention can meet the applications of various sizes of rebars combined at construction sites, effectively reduce the burden of workers carrying and managing the rebar bundling machine, and greatly reduce the cost of machinery procurement at construction sites.

12 Claims, 6 Drawing Sheets

(56) References Cited

FOREIGN PATENT DOCUMENTS

| | | |
|---|---|---|
| CN | 107161375 A | 9/2017 |
| CN | 107165416 A | 9/2017 |
| CN | 107165417 A | 9/2017 |
| CN | 208168382 U | 11/2018 |
| JP | 2016068120 A | 5/2016 |
| TW | 200825258 A | 6/2008 |
| WO | 2017/010122 A1 | 1/2017 |
| WO | 2020/093380 A1 | 5/2020 |

* cited by examiner

REBAR BUNDLING MACHINE, REPLACEABLE GUN HEAD AND WORKING METHOD THEREOF

FIELD OF THE INVENTION

The present invention relates to rebar bundling technical field, particularly to a kind of rebar bundling machine, its replaceable gun head and working method.

BACKGROUND OF THE INVENTION

With the continuous increase of domestic labour costs in recent years, meanwhile, people's demands for working environment and labour intensity are also increasing, especially the high intensity labour and arduous working environment in the construction industry. Similarly, in developed countries in Europe and the United States, companies not only respond to higher labour costs and lower work efficiency and quality, but also to respond to individual demands such as dissatisfaction with work intensity. Therefore, how to realize industrial automation has become an important issue for the development of the whole society. Thus, high-efficiency and low-intensity production tools are gradually being accepted by people, including rebar bundling machines, which can effectively solve the low efficiency and costly issues of manual bundling.

However, there are the following disadvantages due to the existing rebar bundling machines:

(1) The existing rebar bundling machine has a fixed gun head component after a manufacturing is completed, that is, the size of the rebar node corresponding to the gun head component is limited, the size of the rebar nodes that can be wound by a wire circle formed by the gun head component of the rebar bundling machine is also limited. And the gun head component of the rebar bundling machine is only suitable for bundling rebar nodes within a certain size range, that is, there is a requirement for the size range of the superimposed bundling rebar crossing points.

(2) When the superimposed size of the rebar crossing point of the rebar bundling machine exceeds the use range of the gun head component, the rebar bundling machine will not work properly. However, when the superimposed size of the rebar crossing point of the rebar bundling machine is far smaller than the maximum usable range of the gun head component, it will cause problems such as poor rebar bundling, wasted wire, and unstable tightening of the machine. Especially when the superimposed size of the rebar crossing point of the rebar bundling machine is far smaller than the maximum usable range of the gun head component, the process of tightening the wire circle by the rebar bundling machine is very complicated, even if the rebar bundling machine is provided with torque adjustment; it also easily causes the machine control board to make a wrong judgment, so that the wire is too loose to tightly bundle the rebar or the wire is broken.

In this regard, the use of a single rebar bundling machine has limitations, and multiple types of rebar bundling machines are required to meet the complex rebar bundling work at construction sites. Ordinary workers can only carry a single rebar bundling machine for operation, and the rebar bundling cannot be fully covered. If multiple types of rebar bundling machines are used, it will increase the burden on workers and is not conducive to the management of tools.

Due to the above reasons, the rebar bundling machine has not been promoted and popularized. Therefore, the existing rebar bundling machine needs further improvement and innovation.

SUMMARY OF THE INVENTION

The first object of the present invention is to overcome the shortcomings of the prior art, provide a replaceable gun head of rebars. The present invention can meet applications of various sizes of rebars combined at construction sites through the replaceable gun head. The second object of the present invention is to provide a rebar bundling machine. The third object of the present invention is to provide a working method of a rebar bundling machine.

The first object of the present invention is achieved by the following technical solution: a replaceable gun head of a rebar bundling machine, which is characterized by, including a gun head information identification component provided on the gun head, after mounting the gun head on the rebar bundling machine, the gun head information identification component is connected to a main control unit of the rebar bundling machine, and the main control unit obtains the gun head information through the gun head information identification component.

Preferably, the gun head information identification component provided on the gun head is a resistor. After mounting the gun head on the rebar bundling machine, one end of the resistor is connected to the main control unit of the rebar bundling machine, and the other end is grounded or powered. The main control unit obtains the gun head information by detecting the resistance value of the resistor.

Further, the value of the resistor provided on the gun head is selected according to the caliber of the gun head, and the resistance value on the gun head is 1~40 KΩ, 50~80 KΩ, 100~400Ω, 560~820Ω, 1~2Ω, 3~5Ω, 8~10Ω or 20~30Ω.

Among them, after the gun head is mounted on the rebar bundling machine, one end of the resistor is connected to an ADC sampling terminal of the main control unit of the rebar bundling machine, and the voltage across the resistor is collected through the ADC sampling terminal.

Preferably, the gun head information identification component provided on the gun head is an electronic tag for storing gun head information, and the electronic tag provided on the gun head is connected to the main control unit of the rebar bundling machine through an electronic tag reader, the main control unit obtains the gun head information through the electronic tag.

Preferably, the gun head information identification component provided on the gun head is a wireless communication slave module for storing gun head information, and the wireless communication slave module is connected to the main control unit of the rebar bundling machine through a wireless communication module, the main control unit obtains the gun head information from the wireless communication slave module through the wireless communication module.

The second object of the present invention is achieved by the following technical solution: a rebar bundling machine including a gun shell, a main control unit set in the gun shell, a wire feeding motor and a wire twisting motor set in the gun shell, and a gun head mounted on the front of the gun shell, the main control unit is connected to the wire feeding motor and the wire twisting motor through a motor driver, and is used to control the rotation of the wire feeding motor and the wire twisting motor; characterized in that the gun head is the replaceable gun head according to any one of claims 1 to 5.

Preferably, it further comprises a Hall element for detecting the number of turns of the wire feeding motor and a current sampling device for collecting the current value of the wire twisting motor;

the Hall element is connected to the main control unit;
the main control unit is connected to the wire twisting motor through the current sampling device and is configured to judge the torque value of the wire twisting motor according to the current value of the wire twisting motor collected by the current sampling device.

Preferably, it further comprises a light detection device for detecting the number of rotations of the wire feeding motor and a current sampling device for collecting the current value of the wire twisting motor;

the light detection device comprises an aperture and a photocoupler. A plurality of equally spaced light-transmitting grooves are provided on the edge of the aperture, an aperture light-shielding portion is located between each adjacent light-transmitting groove, aperture is mounted on the axis of the wire feeding motor or the gearbox axis of the wire feeding motor, the edge of the aperture extends between a light source and a receiver of the photocoupler, and the photocoupler is connected to the main control unit; when the wire feeding motor rotates, the aperture is rotated, and when the aperture is rotated, the light-transmitting groove and the light-shielding part pass between the light source and the receiver of the photocoupler in order.

The main control unit is connected to the wire twisting motor through the current sampling device and is configured to judge the torque value of the wire twisting motor according to the current value of the wire twisting motor collected by the current sampling device.

The third object of the present invention is achieved by the following technical solution: a working method of the above-mentioned rebar bundling machine, the steps are as follows:

The main control unit sets the rotation number threshold of the wire feeding motor for the gun head according to different gun head information; at the same time, the main control unit sets the torque threshold of the wire twisting motor for the gun head according to different gun head information;

the main control unit obtains the gun head information through the gun head information identification component, and then obtains the rotation number threshold of the wire feeding motor and the torque threshold of the wire twisting motor set according to the gun head information;

when the rebar bundling machine is in the process of wire feeding, the main control unit obtains the current rotation number of the wire feeding motor in real time; when the current rotation number of the motor reaches the threshold of the rotation number of the wire feeding motor obtained above, the main control unit controls the wire feeding wire motor to stop rotating, and the gun head of the rebar bundling machine outputs a wire of corresponding length;

when the rebar bundling machine is in the process of wire twisting, the main control unit collects the current value of the wire twisting motor in real time and judges the current torque value of the wire twisting motor by the current value; when the current torque value of the wire twisting motor reaches the torque threshold of the wire twisting motor obtained above, the main control unit controls the wire twisting motor to stop rotating, and a corresponding torque is output through the wire twisting motor.

Preferably, when the gun head information identification component provided on the gun head is a resistor, after amounting the gun head at the front end of the gun shell, the main control unit obtains the gun head information by detecting the value of the resistor on the gun head;

when the gun head information identification component provided on the gun head is an electronic tag for storing gun head information, the main control unit reads the electronic tag on the gun head through the electronic tag reader, thereby reading the gun head information therein;

when the gun head information identification component provided on the gun head is a wireless communication slave module for storing gun head information, the main control unit communicates with the wireless communication slave module on the gun head through the wireless communication module, thereby obtaining the gun head information;

when the rebar bundling machine is in the process of wire feeding, a Hall element connected to the main control unit detects the current rotation number of the wire feeding motor in real time, when the main control unit detects that the current rotation number of the motor reaches the threshold value of the rotation number of the wire feeding motor obtained through the Hall element, it stops the rotation of the wire feeding motor through the motor driver; or, when the rebar bundling machine is in the process of wire feeding, the main control unit detects the current rotation number of the wire feeding motor in real time through the light detection device, when the main control unit detects that the current rotation number of the motor reaches the above-mentioned threshold of the rotation number of the wire feeding motor through the light detection device, controls the wire feeding motor to stop rotating through the motor driver;

when the rebar bundling machine is in the process of wire twisting, the current acquisition device that connected to the main control unit collects a current value of the twisting motor in real time, and then the current torque value of the wire twisting motor is determined by the current value of the wire twisting motor collected by the current acquisition device, when the current torque value of the wire twisting motor reaches the obtained torque threshold of the wire twisting motor, the main control unit controls the wire twisting motor to stop rotating, and outputs a corresponding torque through the wire twisting motor.

Compared with the prior art, the present invention has the following advantages and effects:

(1) The replaceable gun head of the rebar bundling machine according to the present invention includes a gun head information identification component provided on the gun head, after mounting the gun head on the rebar bundling machine, the gun head information identification component is connected to a main control unit of the rebar bundling machine, and the main control unit obtains the gun head information through the gun head information identification component. In the present invention, setting different gun head information based on gun heads of different calibers, and the main control unit can identify the gun head caliber according to the acquired gun head information, in order to control the wire length and torque output from the gun head of the rebar bundling machine; through the replaceable gun head of the present invention, it can meet the applications of various sizes of rebars combined at construction sites, effectively reduce the burden of workers carrying and managing the rebar bundling machine, and greatly reduce the cost of machinery procurement at construction sites.

(2) In the replaceable gun head of the rebar bundling machine of the present invention, the gun head information identification component provided on the gun head may be a resistor, and the main control unit can obtain the corresponding gun head information by detecting the size of the resistor. Therefore, the structure of the gun head identification component of the present invention is very simple, and the identification of the information of the gun head can be realized only by setting a resistor on the existing gun head.

(3) In the replaceable gun head of the rebar bundling machine of the present invention, the gun head information identification part provided on the gun head may be an electronic tag storing the gun head information, and the electronic tag set on the gun head is connected to the main control unit of the rebar bundling machine through an electronic tag reader, and the main control unit obtains the gun head information through the electronic tag. The above-mentioned gun head information identification component of the present invention does not need to be connected to the main control unit by a wired method, and the main control unit acquires gun head information directly through wireless, therefore the above-mentioned replaceable gun head structure of the present invention can make the structure of the rebar bundling machine simpler.

(4) In the replaceable gun head of the rebar bundling machine of the present invention, the gun head information identification component provided on the gun head may be a wireless communication slave module storing the gun head information, and the wireless communication slave module is connected to the main control unit of the rebar bundling machine through the wireless communication module, the main control unit obtains the gun head information through the communication between the wireless communication module and the wireless communication slave module. Similarly, the above-mentioned gun head information identification component of the present utility model does not need to be connected to the main control unit through a wired manner, it directly acquires the gun head information through a wireless manner, which can make the structure of the rebar bundling machine simpler.

(5) The rebar bundling machine of the present invention comprises the replaceable gun head of the present invention. In the rebar bundling machine, the main control unit sets the threshold value of the rotation number corresponding to the wire feeding motor and the torque threshold value corresponding to the wire twisting motor for different gun head information; after detecting the gun head information, the main control unit obtains the rotation number threshold of the wire feeding motor and the torque threshold of the wire twisting motor set for the gun head information; when the rebar bundling machine is in the process of wire feeding, if the rotation number of the wire feeding motor reaches the threshold value of the rotation number set above, the wire feeding motor is controlled to stop rotating, and at this time, the rebar bundling machine outputs wires with corresponded length. When the rebar bundling machine is in the process of wire twisting, if the torque value of the wire twisting motor reaches the torque threshold, the wire twisting motor is controlled to stop rotating; the rebar bundling machine of the present invention can realize the rebar bundling of various diameters by changing the gun head with different gun head information, it is only necessary to carry one rebar bundling machine with a replaceable gun head and several different caliber gun heads during the actual rebar bundling, which effectively reduces the burden of workers carrying and managing the rebar bundling machine, and greatly reduce the cost of machinery procurement at construction sites.

(6) In the rebar bundling machine of the present invention, the main control unit can accurately detect the number of rotations of the wire feeding motor through the connected Hall element. In addition, the current acquisition device connected to the main control unit of the present invention may be a resistor connected between the main control unit and the motor, the acquisition device is very simple and easy to implement.

(7) In the rebar bundling machine of the present invention, the main control unit can accurately detect the number of rotations of the wire feeding motor through the connected light detection device. Among them, compared with the Hall element, the present invention adopts a light detection device more accurately detect the number of rotations of the wire feeding motor. In the present invention, the accuracy of detecting the number of rotations of the wire feeding motor by using the light detection device can be improved by more than 7.5 times.

(8) In the rebar bundling machine of the present invention, the main control unit is connected with a voice playback device. After the gun head is installed and the gun head information is obtained, the main control unit can play the gun head information through the voice playback device to remind the user of the information such as the model and caliber of the gun head currently used by the rebar bundling machine.

DETAILED DESCRIPTION OF THE PREFERRED EMBODIMENTS

The present invention is described in further detail below with reference to the embodiments and the accompanying figures, but the embodiments of the present invention are not limited thereto.

Embodiment 1

This embodiment discloses a replaceable gun head of a rebar bundling machine, which includes a gun head information identification component provided on the gun head. After the gun head is installed on the rebar bundling machine, the gun head information identification component is connected to the main control unit of the rebar bundling machine. The main control unit obtains the gun head information through the gun head information identification component.

Figure 1:
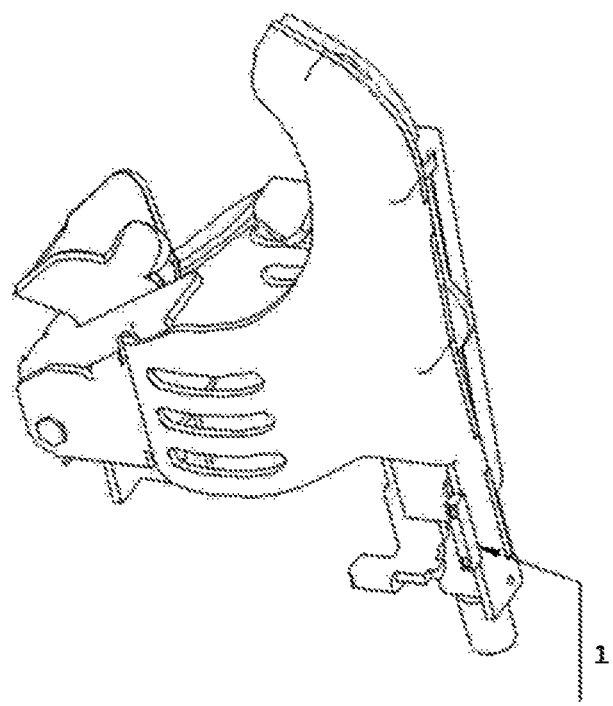
FIG. 1 is a schematic structural diagram of a gun head of a rebar bundling machine in Embodiment 1 of the present invention.

As shown in FIG. 1, the gun head information identification component provided on the gun head in this embodiment is resistor 1. After the gun head is installed on the rebar bundling machine, one end of the resistor is connected to the main control unit of the rebar bundling machine, and the other end is grounded or powered. The main control unit obtains the gun head information by detecting the resistance value of the resistor. The gun head information may be a gun head caliber and/or a gun head model. In this embodiment, the gun head information is a gun head caliber.

In this embodiment, the resistance set on the gun head is selected according to the caliber of the gun head. The resistance on the gun head is 1~40 KΩ, 50~80 KΩ, 100~400 KΩ, 560~820Ω, 1~2Ω, 3~5Ω, 8~10Ω, or 20~30Ω; in this embodiment, a gun head with a diameter of 20 mm uses a resistor of 1~40 KQ, a gun head with a diameter of 25 mm uses a resistor of 50~80 KΩ, a gun head with a diameter of 30 mm uses a resistor of 100~400 KΩ, a gun head with a diameter of 35 mm uses a resistor of 560~820 KQ, a gun head with a diameter of 40 mm uses a resistor of 1~2 MQ, a gun head with a diameter of 45 mm uses a resistor of 3~5 MQ, a gun head with a diameter of 50 mm uses a resistor of 8~10 MQ, and a gun head with a diameter of 60 mm uses a resistor of 20~30 MQ. The main control unit records the relationship between the above-mentioned gun head caliber and resistance. When the main control unit detects the resistance value of the resistor on the gun head, it can obtain the corresponding gun head information, that is, the gun head caliber size information.

After the gun head is installed on the rebar bundling machine, one end of the resistor is connected to the ADC sampling end of the main control unit of the rebar bundling machine, and the ADC sampling end collects the voltage on the resistor. The main control unit can identify the gun head information according to the resistance value of the resistor on the gun head, that is, to obtain the gun head caliber, so as to control the length and torque of the wire output by the gun head of the rebar bundling machine.

Figure 2:
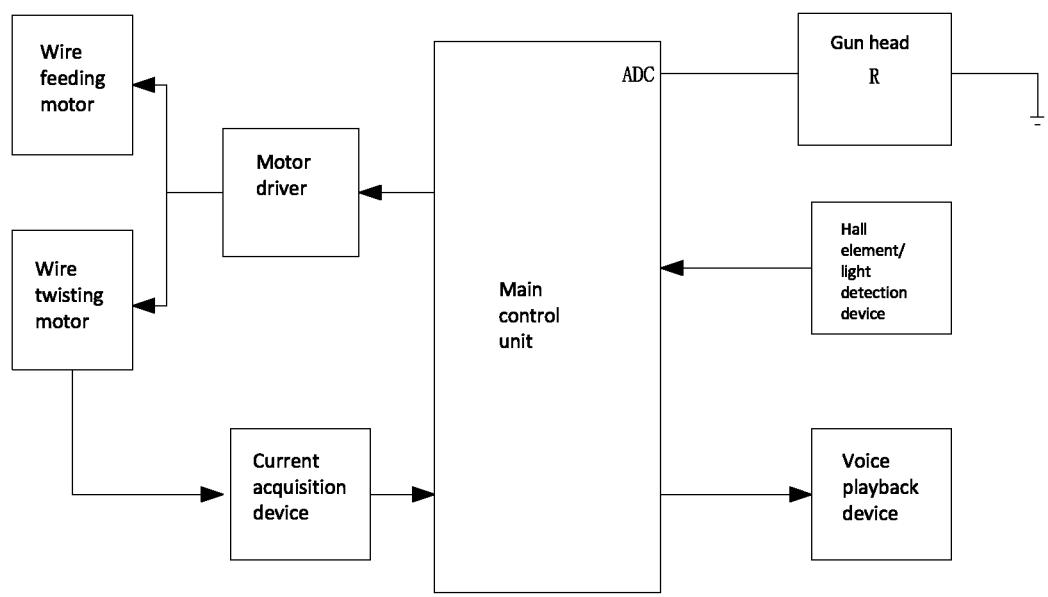
FIG. 2 is a circuit schematic block diagram of a rebar bundling machine in Embodiment 1 of the present invention.
Figure 3:
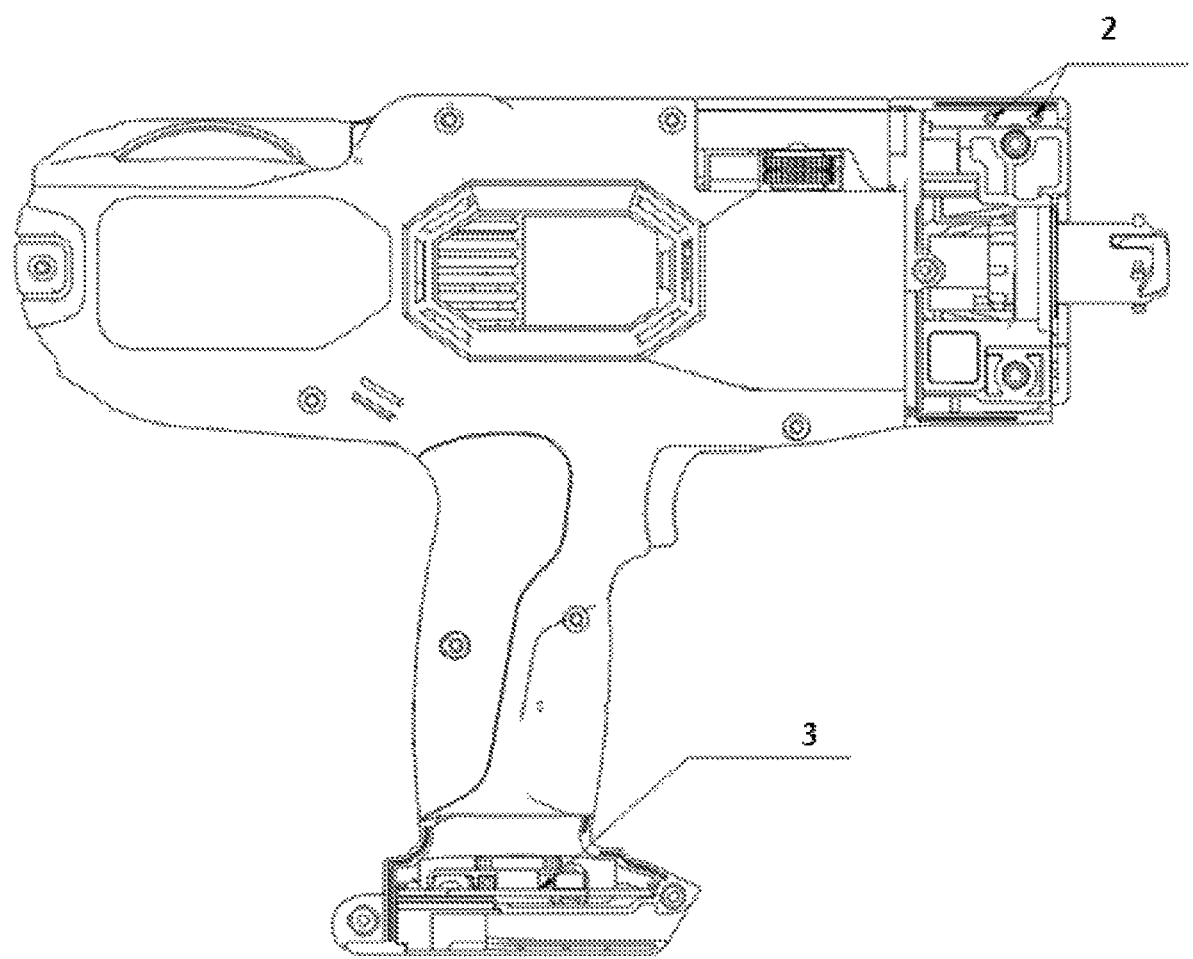
FIG. 3 is a schematic structural diagram of a gun shell of a rebar bundling machine in Embodiment 1 of the present invention.

This embodiment also discloses a rebar bundling machine, which includes a gun shell, a main control unit provided in the gun shell, and the above-mentioned replaceable gun head installed at the front end of the gun shell. As shown in FIG. 2, after installing the gun head at the front of the gun shell, one end of the resistor is connected to the main control unit, and the other end is grounded or powered; after installing the gun head at the front of the gun shell, one end of the resistor is connected to the main control unit, and the other end is grounded or powered. As shown in FIG. 3, the gun shell of the rebar bundling machine of the present embodiment, wherein the main control unit 3 is disposed on a main control board of a handheld portion of the gun shell. In this embodiment, the main control unit may use a single chip microcomputer. The gun head of this embodiment can be fixed on the front end of the gun shell by screws.

In this embodiment, a wire feeding motor, a wire twisting motor, a Hall element that senses the number of rotations of the wire feeding motor, and a current sampling device that collects the current value of the wire twisting motor are also arranged in the gun shell of the rebar bundling machine; as shown in the FIG. 2, the Hall element is connected to the main control unit, and the main control unit detects the number of rotations of the wire feeding motor through the Hall element.

Figure 4A:
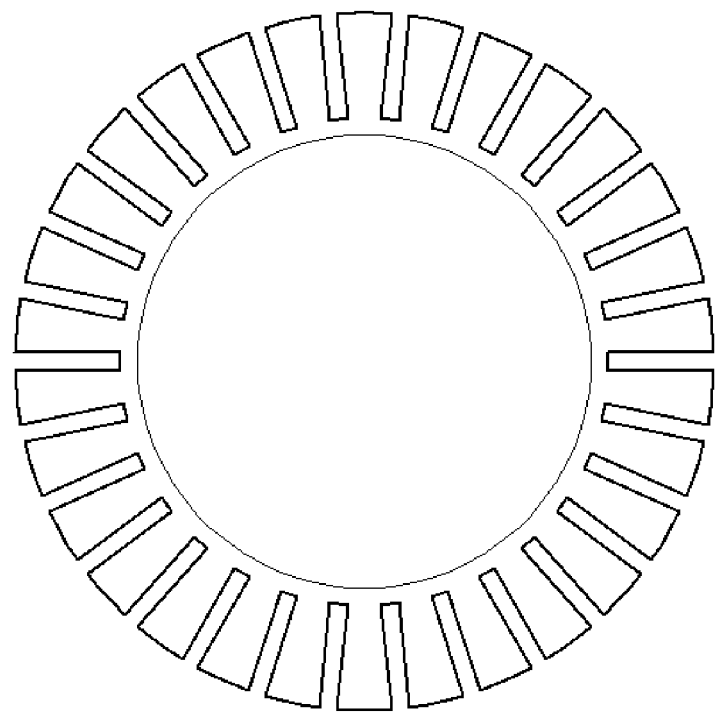
FIG. 4a is a schematic diagram of an aperture structure in a light detecting device of a rebar bundling machine in Embodiment 1 of the present invention.
Figure 4B:
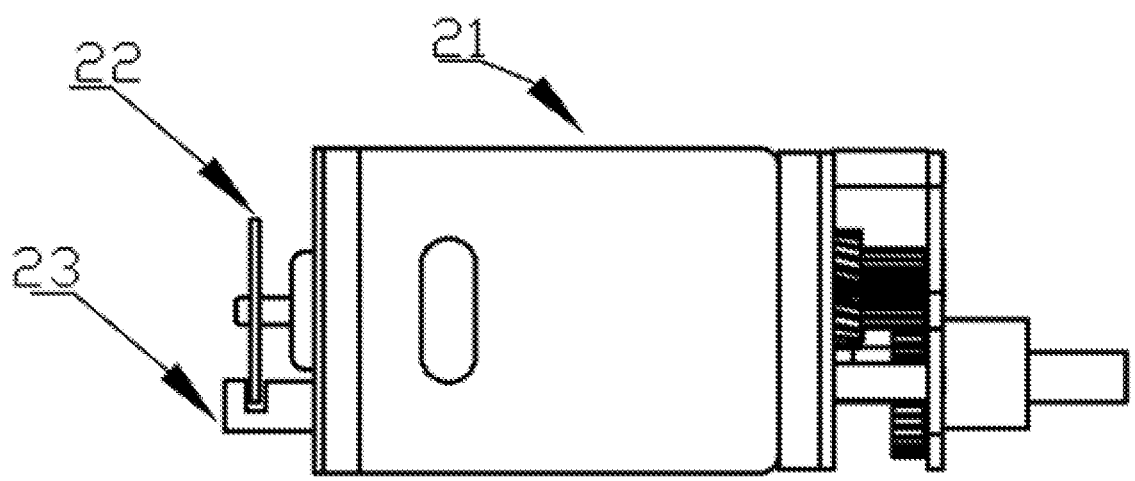
FIG. 4b is a schematic structural diagram of an aperture installed on the axis of a wire feeding motor in a light detection device of a rebar bundling machine in Embodiment 1 of the present invention.
Figure 4C:
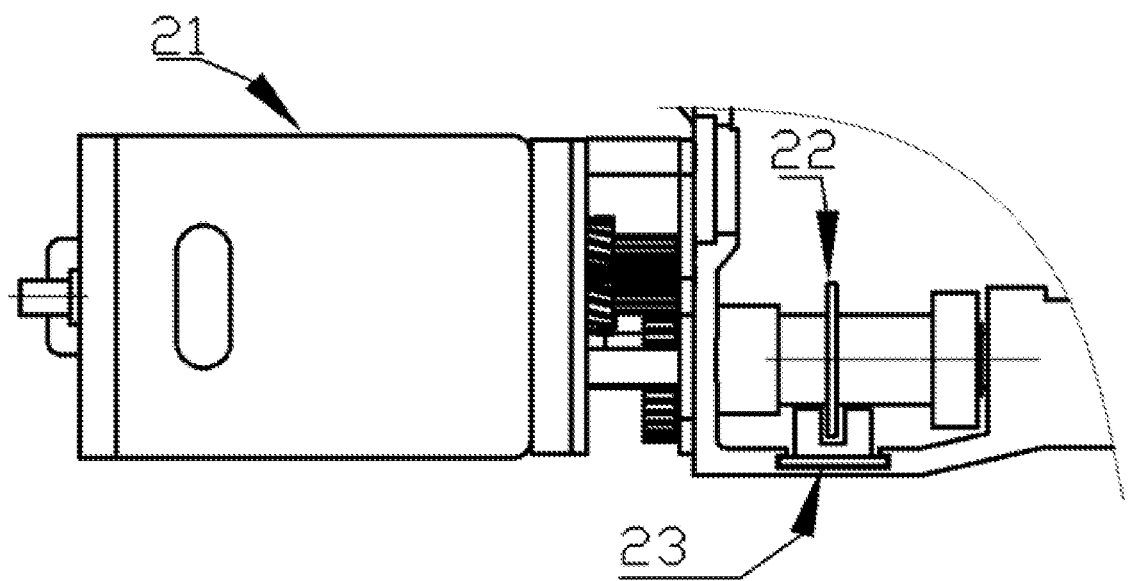
FIG. 4c is a schematic structural diagram of an aperture installed on the axis of a gearbox of a wire feeding motor in a light detection device of a rebar bundling machine in Embodiment 1 of the present invention.

In this embodiment, the number of rotations of the wire feeding motor can also be detected by a light detection device, where the light detection device includes an aperture and a photocoupler, as shown in FIG. 4, a plurality of equally-spaced light-transmitting grooves are set on the edge of the aperture, and the light-shielding part of the aperture is between each adjacent light-transmitting groove, in this embodiment, the number of light-transmitting grooves at the edge of the aperture is 30 or more. As shown in FIGS. 4b and 4c, the aperture 22 is installed on the axis of the wire feeding motor 21 or the axis of the gearbox of the wire feeding motor, the edge of the aperture 22 extends between the light source and the receiver of the photocoupler 23, the photocoupler connects to the main control unit; when the wire feeding motor rotates, the aperture is rotated, and when the aperture is rotated, the light-transmitting groove and the light-shielding part pass between the light source and the receiver of the photocoupler in order. Among them, when the light transmitting slot and the light shielding part of the aperture pass between the light source and the receiver of the photocoupler, the photocoupler will output high and low level signals to the main control unit, and the main control chip accurately judges the number of motor rotations by reading the high and low level change points of the photocoupler. In this embodiment, as shown in FIGS. 4b and 4c, the photocoupler 23 is U-shaped opening, wherein the light source is set on one side of the U-shaped opening, and the light receiver is set on the other side of the U-shaped opening.

The main control unit is connected to the wire feeding motor and the wire twisting motor through a motor driver and is used to control the rotation of the wire feeding motor and the wire twisting motor. In this embodiment, the wire feeding motor and the wire twisting motor of the rebar bundling machine are the same motor or two different motors, when the wire feeding motor and the wire twisting motor are the same one, the motor respectively performs wire feeding and twisting work at different time periods.

The main control unit is connected to the wire twisting motor through the current sampling device and is used to judge the torque value of the wire twisting motor according to the current value of the wire twisting motor collected by the current sampling device.

In this embodiment, the current collection device is a high-power second resistor, and the main control unit is connected to the current output terminal of the motor through the second resistor.

Figure 5:
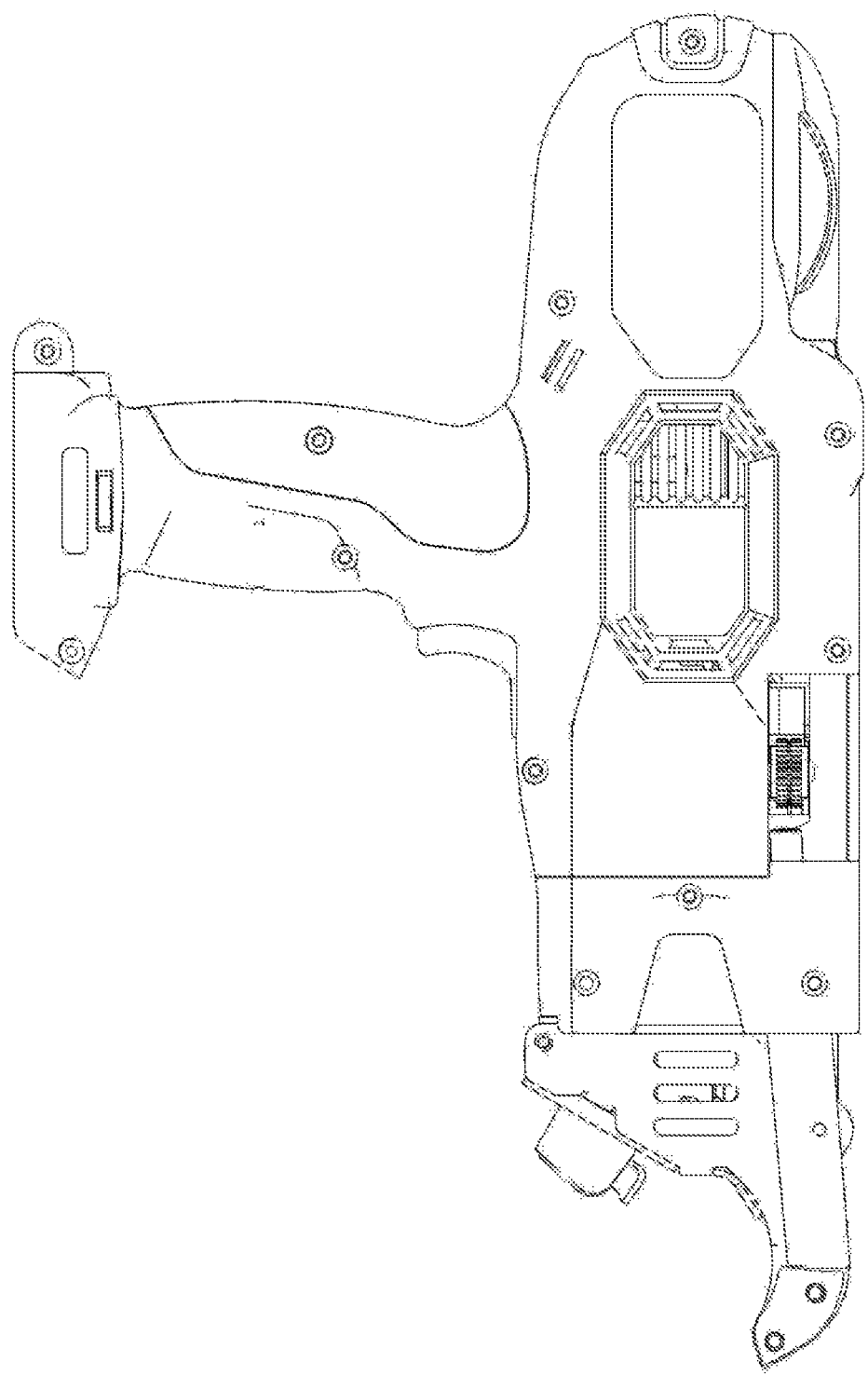
FIG. 5 is a schematic structural diagram of a rebar bundling machine gun head after being installed in Embodiment 1 of the present invention.

As shown in FIG. 3, in this embodiment, the front end of the gun shell is provided with two contact points 2, one of which is connected to the ADC sampling terminal of the main control unit, and the other contact point is grounded or powered. After amounting the gun head at the front end of the gun shell, the two ends of the resistor are connected to the two contact points respectively, as shown in FIG. 5, the rebar bundling machine after the gun head is installed at the front end of the gun shell.

In this embodiment, the main control unit is connected with a voice playback device for playing the gun head information. After acquiring the gun head information, the main control unit can play the gun head information through the voice playback device to remind the user of the rebar bundling machine Information such as the type and size of the gun head used.

This embodiment also discloses a working method of the above-mentioned rebar bundling machine, the steps are as follows:

Step S1, the main control unit sets the threshold of the number of rotations corresponding to the wire feeding motor for different gun head information; at the same time, the main control unit sets the torque threshold for the wire twisting motor for different gun head information;

in this embodiment, the main control unit can set the rotation number threshold corresponding to the wire feeding motor and the torque threshold corresponding to the wire twisting motor for gun heads of different calibers.

Step S2, after the gun head is mounted on the front end of the gun shell, the main control unit collects the voltage of the resistor on the gun head, determines the resistance value of the resistor on the gun head based on the voltage of the resistor on the gun head, and obtains the corresponding gun head information according to the resistance value of the resistor, then obtains the threshold of the number of rotations of the wire feeding motor and the torque threshold of the wire twisting motor set for the gun head information.

Step S3, when the rebar bundling machine is in the process of wire feeding, the main control unit obtains the current number of rotations of the wire feeding motor in real time, when the current number of rotations of the motor reaches the above-mentioned threshold of the number of rotations of the wire feeding motor, the main control unit controls the wire feeding wire motor to stop rotating, and the gun head of the rebar bundling machine outputs a wire of corresponding length.

When the rebar bundling machine is in the process of wire twisting, the main control unit collects the current value of the wire twisting motor in real time, and judges the current torque value of the wire twisting motor by the current value, when the current torque value of the wire twisting motor reaches the torque threshold of the wire twisting motor obtained above, the main control unit controls the wire feeding wire motor to stop rotating, and outputs the corresponding torque through the wire twisting motor.

In this embodiment, when the rebar bundling machine is in the wire feeding process, the Hall element connected to the main control unit detects the current number of rotations of the wire feeding motor in real time, when the main control unit detects that the current number of rotations of the motor reaches the threshold value of the number of rotations of the wire feeding motor obtained through the Hall element, the wire feeding motor is controlled to stop rotation by the motor driver. Alternatively, when the rebar bundling machine is in the process of wire feeding, the main control unit detects the current number of rotations of the wire feeding motor in real time through the light detection device, when the main control unit detects that the current number of rotations of the motor reaches the threshold value of the number of rotations of the wire feeding motor obtained through the light detection device, the wire feeding motor is stopped by the motor driver.

In this embodiment, when the rebar bundling machine is in the process of wire twisting, the current value of the wire twisting motor is collected in real time by a current acquisition device connected to the main control unit, then judge the current torque value of the wire twisting motor by the current value of the wire twisting motor collected by the current acquisition device, when the current torque value of the wire twisting motor reaches the torque threshold of the wire twisting motor obtained above, the main control unit controls the twisting motor to stop rotating, and the corresponding torque is output through the wire twisting motor.

Embodiment 2

Figure 6:
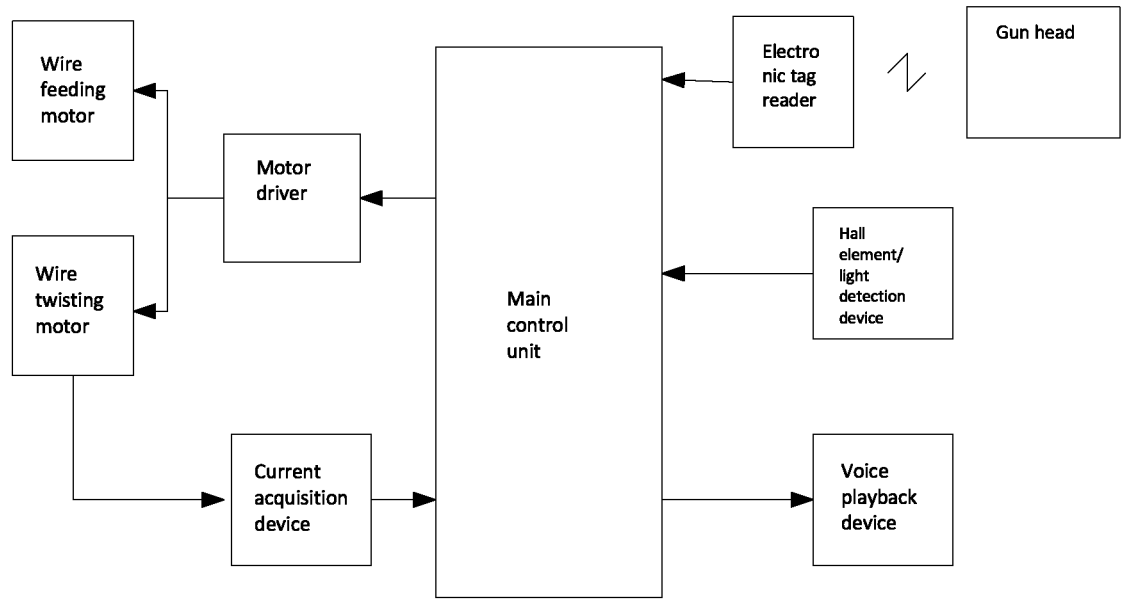
FIG. 6 is a circuit schematic block diagram of a rebar bundling machine in Embodiment 2 of the present invention.

This embodiment discloses a replaceable gun head of a rebar bundling machine, which differs from Embodiment 1 only in that, as shown in FIG. 6, the gun head information identification component provided on the gun head is an electronic tag storing gun head information, the electronic tag is connected to the main control unit of the rebar bundling machine through the electronic tag reader, and the main control unit obtains the gun head information through the electronic tag. The electronic tag may be an RFID electronic tag.

This embodiment also discloses a rebar bundling machine, which differs from the rebar bundling machine in Embodiment 1 only in that the gun head of the bar bundling machine in this embodiment is the replaceable gun head described in this embodiment. An electronic tag reader is connected to the main control unit of the rebar bundling machine in this embodiment. After the gun head is installed on the rebar bundling machine, the main control unit reads the gun head information on the gun head electronic tag through the electronic tag reader.

This embodiment also discloses a working method of a rebar bundling machine, which differs from the working method of a rebar bundling machine in Embodiment 1 only in that in this embodiment, the main control unit in step S2 directly reads the electronic tag on the gun head through the electronic tag reader, and thus reads the gun head information corresponding to the gun head to be installed on the rebar binding machine.

Embodiment 3

Figure 7:
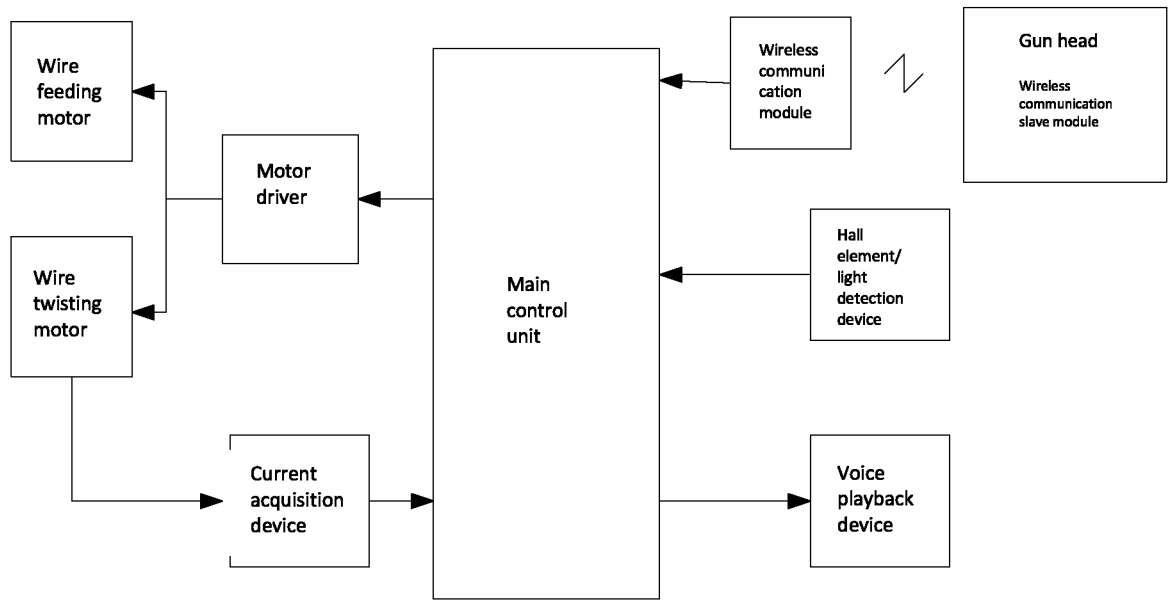
FIG. 7 is a circuit schematic block diagram of a rebar bundling machine in Embodiment 3 of the present invention.

This embodiment discloses a replaceable gun head of a rebar bundling machine, which differs from Embodiment 1 only in that, as shown in FIG. 7, the gun head information identification component provided on the gun head is a wireless communication slave module storing the gun head information in this embodiment, and the wireless communication slave module is connected to the rebar bundling machine through the wireless communication module; wherein, in this embodiment, the main control unit communicates with the wireless communication slave module on the gun head through the wireless communication module, in order to obtain the gun head information stored in the wireless communication slave module.

This embodiment also discloses a rebar bundling machine, which differs from the rebar bundling machine in Embodiment 1 only in that the gun head of the rebar bundling machine in this embodiment is the replaceable gun head described in this embodiment. The main control unit of the rebar bundling machine in this embodiment is connected with a wireless communication module, and the main control unit communicates with the wireless communication slave module on the gun head through the wireless communication module, in order to read the gun head information stored in the wireless communication slave module on the gun head. The wireless communication module connected to the main control unit may be a communication module such as Bluetooth, WIFI or 2.4 G.

This embodiment also discloses a working method of a rebar bundling machine, which differs from the working method of a rebar bundling machine in Embodiment 1 only in that in this embodiment, the main control unit in step S2 communicates with the wireless communication slave module on the gun head through the wireless communication module, thereby obtaining gun head information.

The above embodiments are preferred embodiments of the present invention, but the embodiment of the present invention is not limited by the above embodiments. Any other changes, modifications, substitutions, combinations, and simplifications made without departing from the spirit and principle of the present invention should be equivalent replacement methods, and all are included in the protection scope of the present invention.

The invention claimed is:

1. A replaceable gun head device for a rebar bundling machine, the gun head device comprising:
    a gun head configured to be mounted on the rebar bundling machine, the gun head having a bore for outputting a wire for tying rebars; and
    a gun head information identification component provided on the gun head, the gun head information identification component having gun head information and configured to be connected to a main control unit of the rebar bundling machine;
    wherein the gun head information is diameter information of the bore of the gun head;
    wherein the gun head information identification component provided on the gun head is a resistor or an electronic tag for storing gun head information;
    wherein when the gun head information identification component is the resistor, one end of the resistor is configured to be connected to the main control unit of the rebar bundling machine, and another end of the resistor is configured to be grounded or powered;
    wherein when the gun head information identification component is the electronic tag, the electronic tag provided on the gun head is configured to be connected to the main control unit of the rebar bundling machine through an electronic tag reader.

2. The replaceable gun head device according to claim 1, wherein when the gun head information identification component is the resistor, a value of the resistor on the gun head is 1~40 KO, 50~80 KO, 100~400 KO, 560~820 KO, 1~2 MO, 3~5 MO, 8~10 MO or 20~30 MO; and wherein one end of the resistor is configured to be connected to an ADC sampling terminal of the main control unit of the rebar bundling machine.

3. A rebar bundling machine including a gun shell, a main control unit set in the gun shell, a wire feeding motor and a wire twisting motor set in the gun shell, and a gun head device mounted on the front of the gun shell, the main control unit is connected to the wire feeding motor and the wire twisting motor through a motor driver, and is used to control the rotation of the wire feeding motor and the wire twisting motor; wherein the gun head device comprises: a gun head having a bore for outputting a wire for tying rebars; and
    a gun head information identification component provided on the gun head, the gun head information identification component having gun head information and connected to the main control unit of the rebar bundling machine to provide the main control unit with the gun head information;
    wherein the gun head information is diameter information of the bore of the gun head.

4. The rebar bundling machine according to claim 3, wherein the rebar bundling machine further comprises a Hall element for detecting the number of turns of the wire feeding motor and a current sampling device for collecting a current value of the wire twisting motor;
    the Hall element is connected to the main control unit;
    the main control unit is connected to the wire twisting motor through the current sampling device and is configured to judge the torque value of the wire twisting motor according to the current value of the wire twisting motor collected by the current sampling device.

5. The rebar bundling machine according to claim 3, wherein the rebar bundling machine further comprises a light detection device for detecting the number of rotations of the wire feeding motor and a current sampling device for collecting a current value of the wire twisting motor;
    the light detection device comprises an aperture and a photocoupler, a plurality of equally spaced light-transmitting grooves are provided on an edge of the aperture, an aperture light-shielding portion is located between each adjacent light-transmitting groove, the aperture is mounted on an axis of the wire feeding motor or a gearbox axis of the wire feeding motor, the edge of the aperture extends between a light source and a receiver of the photocoupler, and the photocoupler is connected to the main control unit; when the wire feeding motor rotates, the aperture is rotated, and when the aperture is rotated, the light-transmitting groove and the light-shielding part pass between the light source and the receiver of the photocoupler in order;
    the main control unit is connected to the wire twisting motor through the current sampling device and is configured to judge a torque value of the wire twisting motor according to the current value of the wire twisting motor collected by the current sampling device.

6. A working method of the rebar bundling machine according to claim 3, the method comprising:
    setting a rotation number thresholds of the wire feeding motors and a torque threshold of the wire twisting motors via the main control unit for the gun head according to the shows gun head information of the gun heads;
    obtaining the gun head information from the gun head information identification component via the main control unit, and then obtaining the rotation number threshold of the wire feeding motor and the torque threshold of the wire twisting motor set according to the gun head information of the gun head information;
    obtaining a current rotation number of the wire feeding motor in real time via the main control unit when the rebar bundling machine is in the process of wire feeding, controlling the wire feeding wire motor to stop rotating via the main control unit; when the current rotation number of the motor reaches the rotation number threshold of the wire feeding motor obtained above, and outputting a wire of corresponding length through the gun head of the rebar bundling machine; and collecting a current value of the wire twisting motor in real time and judging a current torque value of the wire twisting motor by the current value via the main control unit when the rebar bundling machine is in the process of wire twisting, controlling the wire twisting motor to stop rotating via the main control unit; when the current torque value of the wire twisting motor reaches the torque threshold of the wire twisting motor obtained above, and outputting a corresponding torque is output through the wire twisting motor.

7. The method of a rebar bundling machine according to claim 6, wherein the method further comprises:

obtaining the gun head information by detecting a value of a resistor on the gun head through the main control unit wherein the resistor is the gun head information identification component provided on the gun head.

8. The method according to claim 6, wherein the method further comprises:

reading an electronic tag storing gun head information on the gun head through the electronic tag reader by the main control unit to read the gun head information wherein the electronic tag is the gun head information identification component provided on the gun head.

9. The method according to claim 6, wherein the method further comprises:

communicating with a wireless communication slave module storing gun head information on the gun head through a wireless communication module by the main control unit to obtain the gun head information wherein the wireless communication slave module is the gun head information identification component provided on the gun head.

10. The method according to claim 6, wherein the method further comprises:

detecting the current rotation number of the wire feeding motor in real time by a Hall element connected to the main control unit when the rebar bundling machine is in the process of wire feeding, and stopping the rotation of the wire feeding motor through the motor driver by the main control unit when the main control unit detects that the current rotation number of the motor reaches the threshold value of the rotation number of the wire feeding motor obtained through the Hall element.

11. The method according to claim 6, wherein the method further comprises:

detecting the current rotation number of the wire feeding motor in real time through a light detection device by the main control unit when the rebar bundling machine is in the process of wire feeding, and controlling the wire feeding motor to stop rotating through the motor driver by the main control unit when the main control unit detects that the current rotation number of the motor reaches the above-mentioned threshold of the rotation number of the wire feeding motor through the light detection device.

12. The method according to claim 6, wherein the method further comprises:

collecting a current value of the twisting motor in real time through a current acquisition device connected to the main control unit when the rebar bundling machine is in the process of wire twisting, determining the current torque value of the wire twisting motor by the current value of the wire twisting motor collected by the current acquisition device, controlling the wire twisting motor to stop rotating by the main control unit when the current torque value of the wire twisting motor reaches the obtained torque threshold of the wire twisting motor, and outputting a corresponding torque through the wire twisting motor.

* * * * *

UNITED STATES PATENT AND TRADEMARK OFFICE
CERTIFICATE OF CORRECTION

| | | |
|---|---|---|
| PATENT NO. | : 12,179,947 B2 | Page 1 of 1 |
| APPLICATION NO. | : 17/047459 | |
| DATED | : December 31, 2024 | |
| INVENTOR(S) | : Yongyang Luo et al. | |

It is certified that error appears in the above-identified patent and that said Letters Patent is hereby corrected as shown below:

In the Claims

Column 12, delete Lines 52-56. Insert --setting a rotation number threshold of the wire feeding motor and a torque threshold of the wire twisting motor via the main control unit for the gun head according to the gun head information of the gun head;--

Signed and Sealed this
Eleventh Day of November, 2025

John A. Squires
*Director of the United States Patent and Trademark Office*